United States Patent [19]

Kahn

[11] Patent Number: 5,161,978

[45] Date of Patent: Nov. 10, 1992

[54] METHOD FOR AUTHORING, FORMATING AND PRESENTING INFORMATION TO BE LEARNED OR MEMORIZED

[76] Inventor: Richard G. Kahn, Winona Rd., R.F.D. #1, Box 154, Ashland, N.H. 03217

[21] Appl. No.: 603,167

[22] Filed: Oct. 25, 1990

[51] Int. Cl.$^5$ .............................................. G09B 3/00
[52] U.S. Cl. .................... 434/348; 434/327; 434/427
[58] Field of Search ............... 434/176, 178, 317, 327, 434/346, 348, 427, 405; 273/273

[56] References Cited

U.S. PATENT DOCUMENTS

| | | | |
|---|---|---|---|
| 203,988 | 5/1878 | Bailey . | |
| 1,641,982 | 9/1927 | McDade | 434/348 |
| 1,666,337 | 4/1928 | McDade | 434/348 |
| 3,069,168 | 12/1962 | Feldman et al. | 273/130 |
| 4,770,636 | 9/1988 | Buschke | 273/273 X |
| 4,934,709 | 6/1990 | Peterson | 273/273 X |

*Primary Examiner*—Richard J. Apley
*Assistant Examiner*—Karen Richard

[57] ABSTRACT

A method and apparatus for presenting information to be learned and/or memorized, wherein the information is reduced to a columnar format, reduced to a reduced text column format which includes only capitalized letters and logical symbols, and further reduced to a fully reduced text cue column format so that the capitalized letters are replaced by non-text symbols; the information is presented by first displaying the topic, topic type and text column format, next displaying the topic, topic type and reduced text cue column format, next displaying the topic, topic type fully reduced text cue column format; and finally concealing topic, topic type, text column, reduced text cue column, and fully reduced text cue column; the information is reinforced by first displaying the topic, topic type and fully reduced text cue column, next displaying the topic, topic type and reduced text cue column, and finally displaying the topic, topic type and text column. The color, size and style of the font or typeface used to display the topic, topic type, text column, reduced text column and non-text column depends upon the type of topic being presented.

19 Claims, 6 Drawing Sheets

METHOD FOR AUTHORING, FORMATING AND PRESENTING INFORMATION TO BE LEARNED OR MEMORIZED

BACKGROUND OF THE INVENTION

1. Field of the Invention

This invention relates to a method and a masking apparatus for presenting information to be learned and/or memorized, involving the reduction of a sentence, phrase, or list of information to be memorized into a special format, and a sequential presentation of the reduced text. During the presentation of the reduced text, the sentence, phrase, or list of information is recited while viewing, then masking, columns of text, reduced text cues and non-text cues. Conditioned physical responses through vocalization and subvocalization and conditioned mental responses to a series of gradually reduced visual cues are used to store and recall the rhythm and content of the text being memorized.

2. Discussion of the Related Art

Methods for presenting information to be memorized are, in general, known. For example, a method for presenting information is described in U.S. Pat. No. 203,988, issued to Charles Bailey on May 21, 1878. In this patent, the educational appliance is a revolving letter indicator, consisting of a revolving letter disk, a radially slotted guard plate, a rim flange, indicator, handle, and pivot. A disadvantage of t his method for presenting information is that the slot is of limited width, admitting only a single letter or figure to be viewed. As a result, this device may not be used to present phrases or text. Furthermore, this device does not allow the sequential presentation of successively reduced text.

In another method for presenting information to be memorized, the information is reduced to an acronym and the acronym is memorized. The disadvantage of methods using acronyms is that multiple essentially meaningless acronyms are memorized, with the result that the significance of the acronyms is forgotten.

SUMMARY OF THE INVENTION

An object of the present invention, therefore, is to provide a method and apparatus for the organization and presentation for any kind of information to facilitate learning, memorization and recall. Information that can be used with this procedure includes (but is not limited to) substantive and procedural knowledge and "non-knowledge" types of information, such as data sets and encryption codes.

According to the first aspect of the invention, there is provided a method of reducing and presenting information. A topic and topic type (e.g., idea, fact, rule, definition) are entered, along With an informational text. The text is formatted so that key words, key phrases, and logical connectors within key phrases are capitalized. The text is then organized into text column format, in which each key word or key phrase, logical connector and any insignificant words following, is positioned within a column below the previous key word or key phrase (the first key word or key phrase having been positioned at the top of the column). The text is reduced into reduced text cue column format, in which each of the key words in the text column format is replaced by its first letter, and each logical connector is replaced by a logical symbol. The text is further reduced into non-text cue column format wherein each letter in the reduced text cue column format is replaced by a symbol.

The information to be memorized is presented sequentially, first the topic, topic type and text in text column format, next the reduced text cue column, and then the non-text cue column. The font or typeface used to present the information can vary with the type of topic being presented. The information is reinforced by performing the above sequence in reverse order. All of the capitalization, substitution, reduction, formatting, font selection and presentation cycle can be performed manually or automatically.

According to the second aspect of the invention, there is provided a masking apparatus for sequentially presenting selected portions of a formatted text. The masking apparatus is a rectangular flat body with a right flap formed by a fold in the body, a left flap formed by a fold in the body, a center portion being a part of the body between the left flap and right flap, the center portion having an opening, and a fourth flap having an edge pivotally connected to the body adjacent to the fold forming the left flap.

The masking apparatus may also be a rectangular frame having a slot in the bottom into which a sliding panel is inserted, and grooves along the sides along which the panel may be moved. The sliding panel is removably inserted into the frame through the slot. A left pair of opposing flaps is pivotally connected along adjacent edges by a left hinge. A center pair of opposing flaps is pivotally connected along adjacent edges to a center hinge. A right flap is pivotally connected to a right hinge. The hinges are pivotally connected to the top of the frame by a plurality of hinges providing for movement of the flaps to positions in 180° angular relation whereby a text placed under the frame is visible in one position of the flaps and is invisible in the other position.

BRIEF DESCRIPTION OF THE DRAWINGS

The present invention will be described below with reference to the accompanying drawings, wherein.

DETAILED DESCRIPTION OF THE PREFERRED EMBODIMENTS

Figure 1:
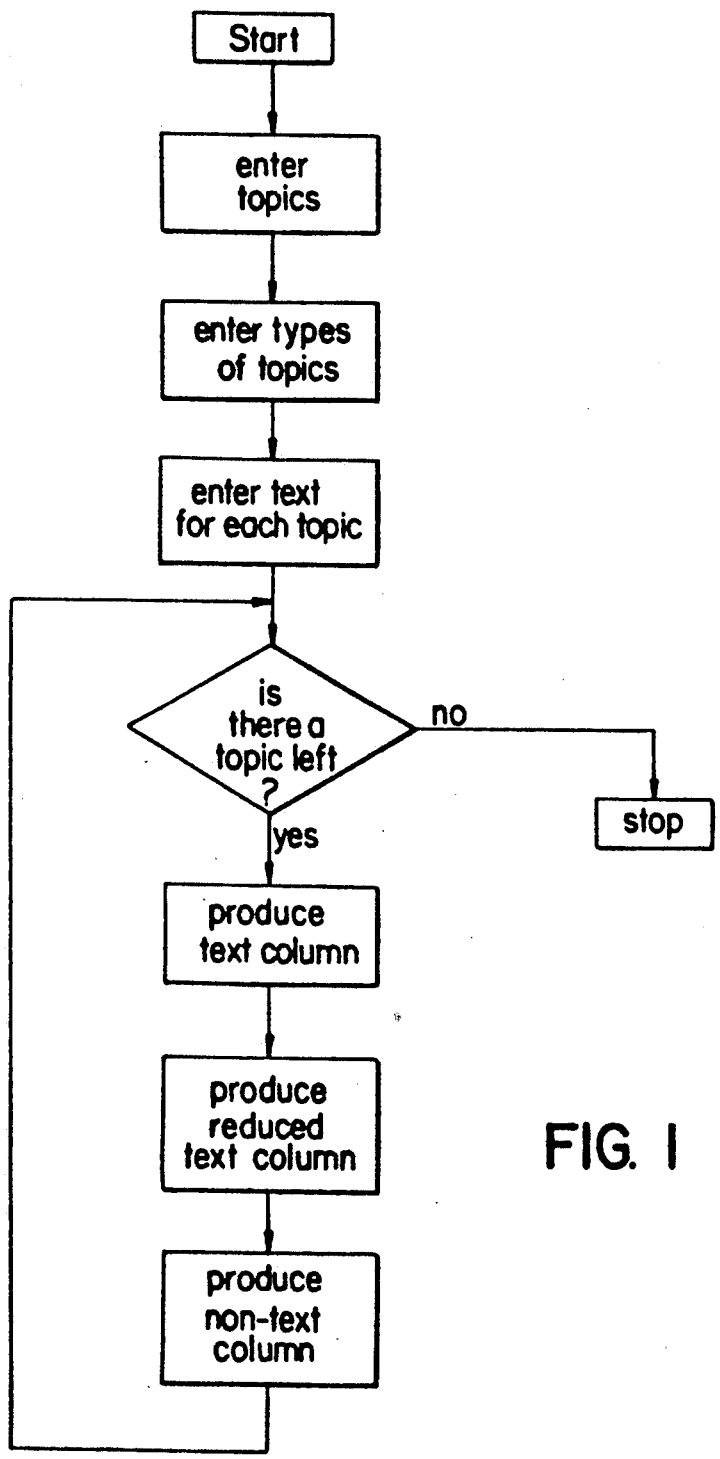
FIG. 1 is a flowchart of the text reduction process.
Figure 3:
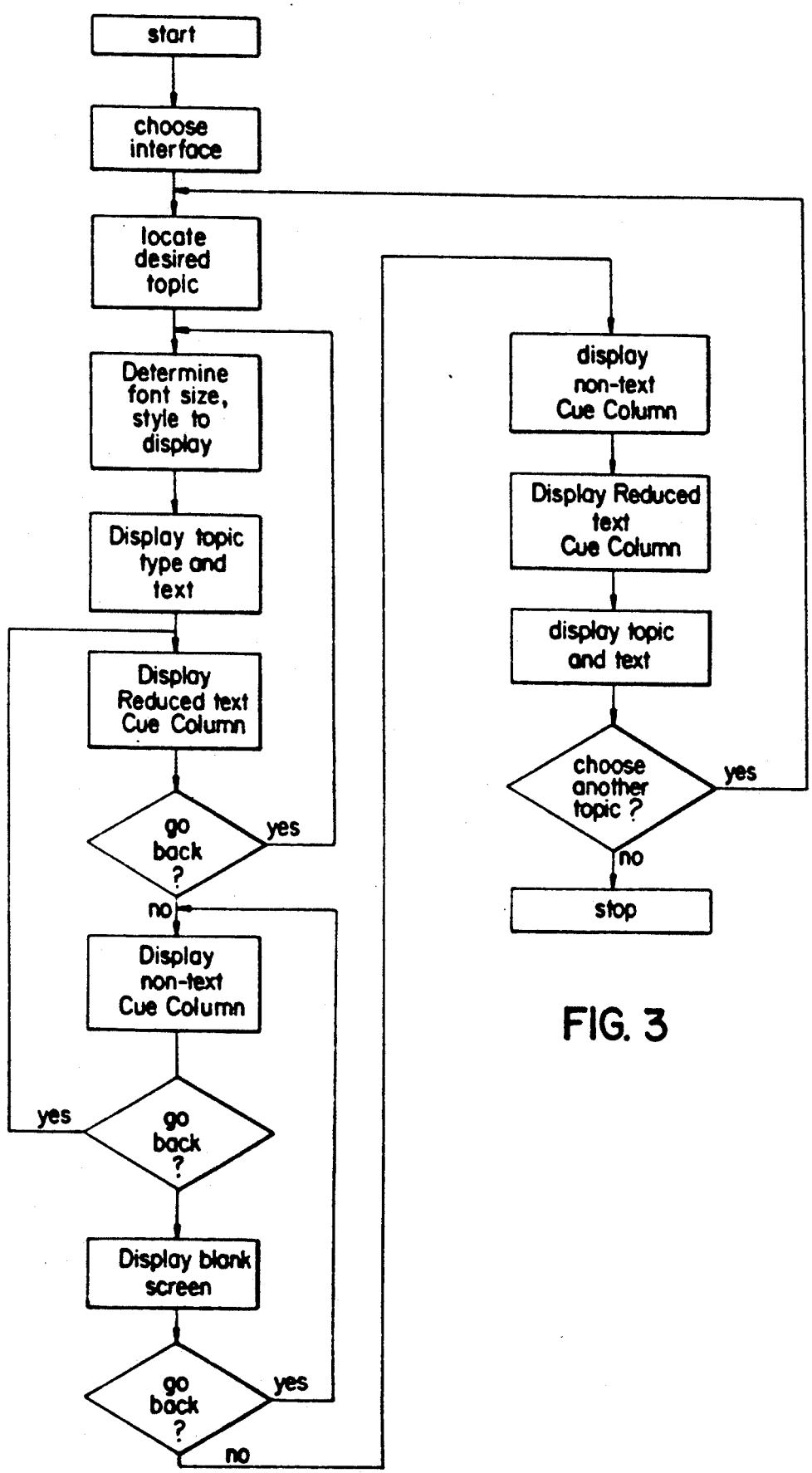
FIG. 3 is a flowchart of the text presentation process.

Referring now in detail to the drawings, FIGS. 1 and 3 are flowcharts of a method for presenting information to be memorized in accordance with the present invention. FIG. 1 illustrates a text reduction process. A plurality of topics and the types of those topics are first listed and recorded. Next, a text or sentence, comprising a plurality of key words, logical words, and insignificant words for each topic, is listed and recorded. In the text, the key words and logical words are identified (by comparing them with pre-existing lists of insignificant words and logical connector words) and their first letters are capitalized. Insignificant words in the pre-existing list would include, for example, "a", "the", "of", "by".

Figure 2:
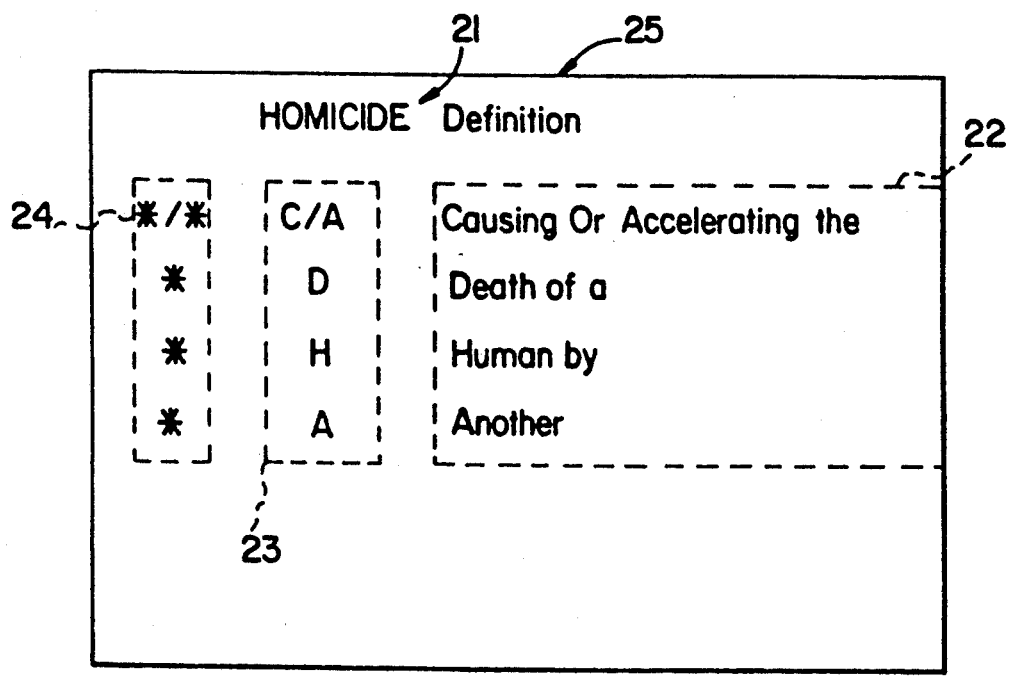
FIG. 2 is a plan view of an example of text in reduced format.

The text is next reduced and recorded. FIG. 2 is an example of text in reduced format. For each topic (21), the topic type (25) is listed, and the text sentence is reduced to a text column format (22), a reduced text cue column format (23), and a non-text cue column format (24) which is recorded. Text column format (22) is produced by manually or automatically breaking the text into key words or key words linked by logical words, and recording on an appropriate medium. Reduced text cue column format (23) is produced by manually or automatically eliminating non-capitalized letters and replacing logical connector words with logical symbols, and recording on an appropriate medium. Non-text cue column format (24) is produced by replacing each capitalized letter with a non-text symbol, such as an asterisk or bullet, and recording on an appropriate medium. Numerals and numbers which appear in a text column are not reduced in the reduced-text cue and non-text cue columns.

FIG. 3 illustrates a text presentation process. The user first chooses a desired presentation format. For example, the user can specify whether to use the non-text cue columns in the presentation cycle, and if so, whether to use the default symbol or some other user-specified symbol to represent keywords in the non-text cue columns. The desired topic and text for the topic are located.

The topic and topic type are presented and the text column, reduced text cue column and non-text cue column are masked. The user repeats the topic and topic type vocally, sub-vocally and mentally while reading them. The topic and topic type are then masked and the topic and topic type are repeated vocally, sub-vocally and mentally.

Next, the topic, topic type and text columns are presented and the reduced text column and non-text column are left masked. The user connects the topic, topic type and text column into a sentence and repeats that sentence vocally, sub-vocally and mentally while reading the corresponding words of the topic, topic type and text column.

The text column is masked, and the reduced text cue column is presented, while waiting for the user to proceed. Again, before the user proceeds, the sentence should be repeated vocally, subvocally, and mentally while "reading" the corresponding characters, numerals and symbols of the reduced text cue column. The reduced text cue column is masked and the non-text cue column is presented, while waiting for the user to proceed. Again, the user should repeat the sentence vocally, subvocally, and mentally while "reading" the corresponding numerals and symbols of the non-text cue columns before proceeding. Finally, all of the text and reduced text is masked while waiting for the user to proceed. Before proceeding, the user should repeat the sentence vocally, subvocally, and mentally. The user can alternatively return to the previous reduced text column instead of proceeding.

The process of learning and memorizing the sentence is reinforced by reversing the foregoing steps as follows. The topic and topic type and the non-text cue column are presented while waiting for the user to proceed. Before proceeding, the user should repeat the sentence vocally, subvocally, and mentally while "reading" that column. Next, the non-text cue column is masked and the reduced cue text column is presented, while waiting for the user to proceed. The user should repeat the sentence vocally, subvocally, and mentally before proceeding. The reduced text cue column is masked and the text column is presented, while waiting for the user to proceed. Again, before proceeding, the user should repeat the sentence vocally, subvocally, and mentally while "reading" that column. The user may choose another topic, for which the presentation and reinforcement of text are performed.

Figure 5:
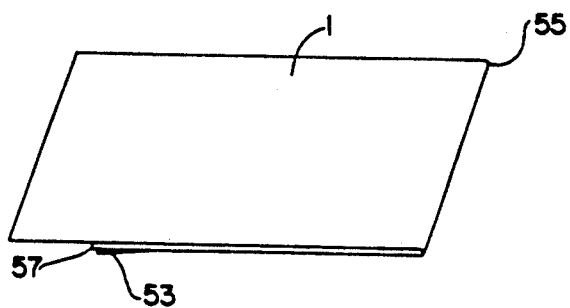
FIG. 5 is a perspective view of a masking apparatus in folded position wherein the right portion is flipped to a position to expose the text column.
Figure 4:
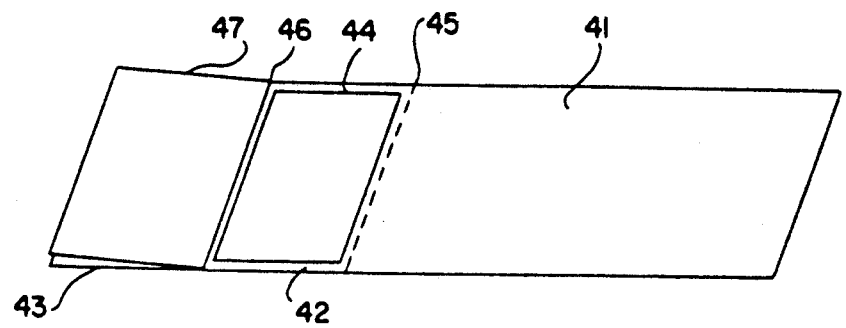
FIG. 4 is a perspective view of a masking apparatus in fully expanded position.
Figure 6:
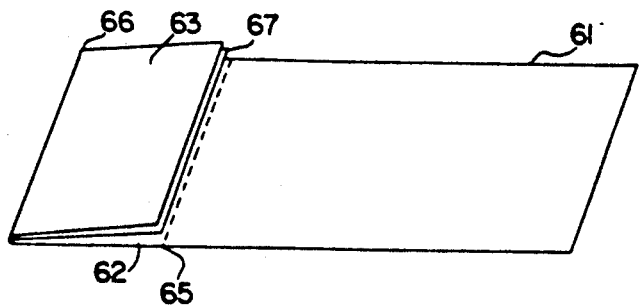
FIG. 6 is a perspective view of a masking apparatus in folded position wherein the left portion is flipped to a position to expose the non-text cue column and cover the reduced text cue column.

Referring now in detail to the drawings and FIGS. 4-6, first to FIG. 4, a masking apparatus in accordance with the present invention will be seen to comprise a rectangular flat body folded into a right-most flap (41), a center portion (42), and a left-most flap (43), an opening (44), two folds (45, 46), and a third flap (47) pivotally connected along an edge adjacent to the center portion (42) and the left-most flap (43). The masking apparatus is preferably made of cardboard but can also be formed from any other suitable material. The flaps (41,43) and center portion (42) are formed by linear folds in the body (45,46), whereby the mask is capable of being in an open plane position as in FIG. 4; in a position with the right-most flap (51) overlapping the other flaps (53, 57) and center portion (62) as in FIG. 5; or in a position with the left-most flap (63) covering the center portion (62) and the pivoting flap (67) as in FIG. 6. The center portion (42) is provided with an opening (44) for facilitating viewing of a center column of text over which the mask is held. The mask should be the size of a page of the text.

Figure 7:
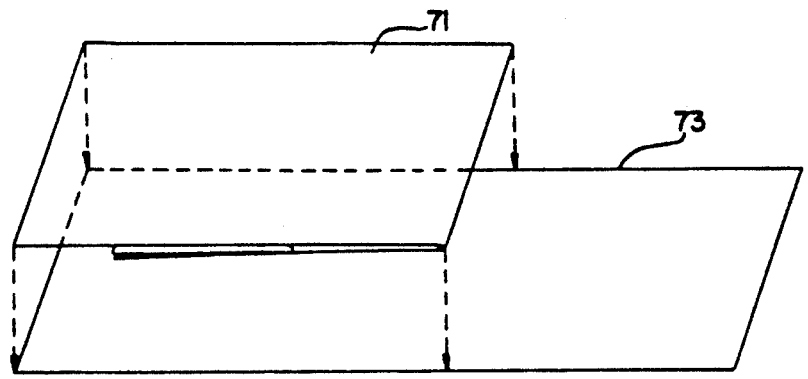
FIGS. 7 through 10 are perspective views of a masking apparatus and a text, illustrating the relation of the masking apparatus to the formatted text.
Figure 8:
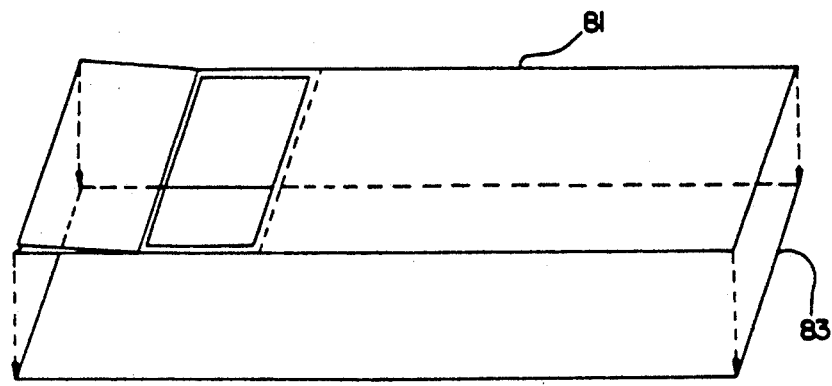
Figure 9:
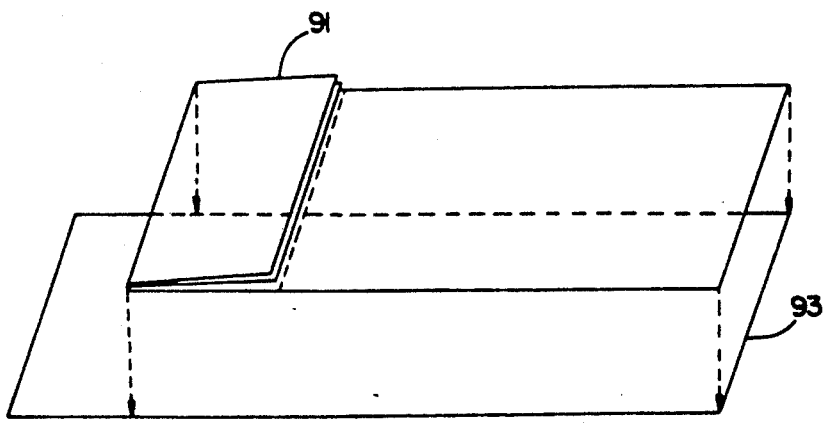
Figure 10:
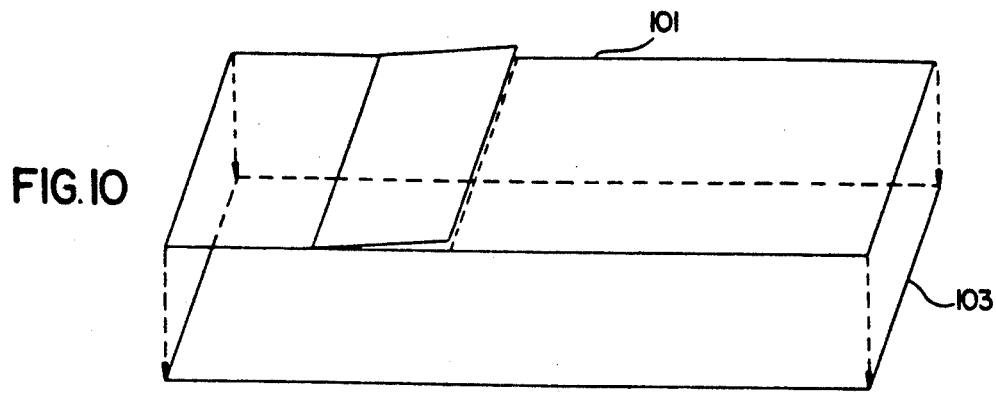

Having set forth the structure of the masking apparatus as shown in FIGS. 4-6, FIGS. 7-10 are now referred to in the following description of use of the masking apparatus in presenting the formatted text:

a) The mask (101) is placed over the formatted text (103) in the configuration as in FIG. 10, covering the text column, non-text cue column and reduced text cue column but not the topic and topic type. The user reads and repeats the topic and topic type vocally, subvocally, and mentally while reading them. The mask is moved to a position covering the topic and topic type and the user repeats the topic vocally, subvocally, and mentally.

b) The mask (71) is then placed and configured as in FIG. 7, so that the topic, topic type and text column are exposed, and the reduced text column and non-text columns are masked. The user makes up a sentence containing the topic, topic type and text column and repeats that sentence vocally, sub-vocally, and mentally while "reading" the topic, topic type and text column. The user mentally notes a rhythm of the sentence by observing an emphasis and an inflection naturally placed on words in the sentence.

c) The user then immediately exposes the reduced text cue column and covers the non-text cue column and the text column of the text (83) with the mask (81) in the configuration shown in FIG. 8. The user repeats the sentence vocally, subvocally, and mentally while "reading" the topic, topic type and reduced text column. Mental note is made of the rhythm of the sentence.

d) The user then immediately exposes the non-text cue column and covers the reduced text cue column and the text column of the text (93) with the mask (91) in the configuration shown in FIG. 9. The user repeats the sentence vocally, subvocally, and mentally while "reading" the topic, topic type and non-text cue column. Again, mental note is made of the rhythm of the sentence.

e) The user then manipulates the mask (101) so that it is fully extended with the pivotally connected flap covering the opening, as shown in FIG. 10. The mask is placed over the text column, reduced text column, and non-text column of the text (103). The user repeats the sentence vocally, subvocally, and mentally while "reading" the topic and topic type. Mental note is made of the rhythm of the sentence.

f) The user then looks up so that the formatted text is not in view. The user repeats the sentence vocally, subvocally, and mentally. Again, mental note is made of the rhythm of the sentence.

g) If at any time the user cannot recall any part of the sentence, the user can repeat the preceding step and move forward through the remaining steps.

h) The user reinforces the presentation by repeating steps b) through e), in reverse order.

Figure 11:
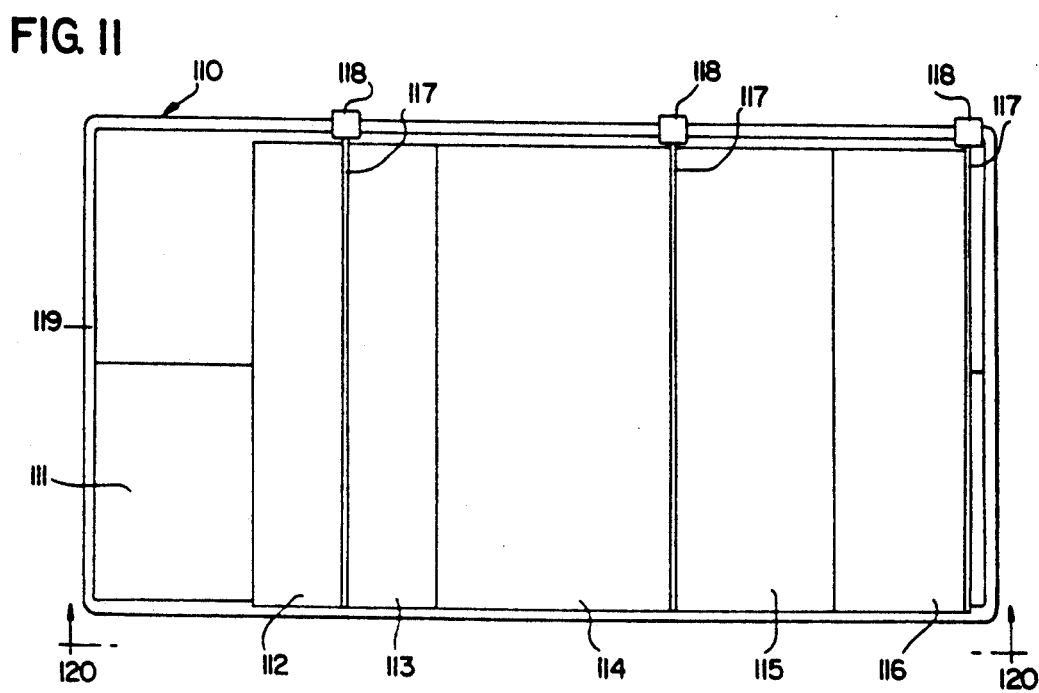
FIG. 11 is a plan view of a multiple masking apparatus with the device configured to mask all text.
Figure 12:
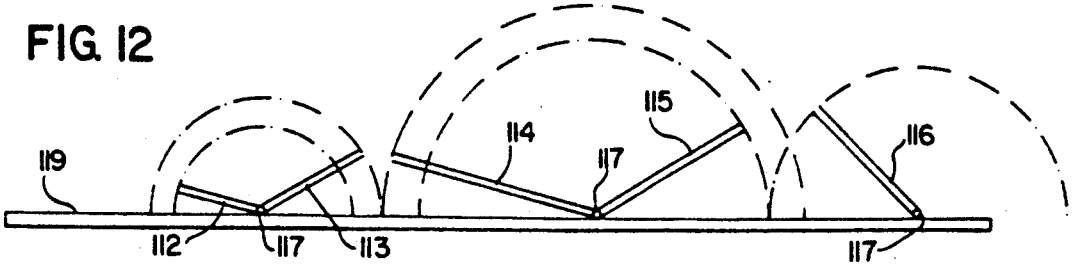
FIG. 12 is an end elevational view of the apparatus of FIG. 11, as observed in the plane of line 120—120.

Referring now to the drawings and FIGS. 11 and 12, another preferred embodiment of the masking apparatus (110) will be seen to comprise a sliding panel a leftmost pair of hinged flaps (112,113), a center pair of hinged flaps (114,115), a right hinged flap (116), a plurality of long hinges to which one or two flaps are connected (117), and a plurality of hinges (118) for connecting the long hinges to a frame, and the rectangular frame (119).

The masking apparatus (110) may be used with a text in reduced format having a large degree of detail or coverage due to multiple fields in a topic. The sliding panel (111) may be formed of rigid plastic or other suitable light weight material, and is inserted into a slit in the bottom of the frame and moves along grooves in the sides of the frame (119). The sliding panel slides down to unmask vertically-arranged fields of text, reduced text cue and non-text cue columns. The frame is formed of rigid plastic or other suitable material, and is as large as a page of text with which it is to be used. The plurality of hinged flaps (112, 113, 114, 115, 116) are rotatably connected to the long hinges, and are preferably made of plastic but can also be formed from any other suitable material. The long hinges (117) provide for the flaps (112-116) to be flipped to positions in 180° angular rotation on either side of the hinge (117), as shown in FIG. 12. Flap (112) is used to cover the non-text cue column; flap (113) is used to cover the reduced text cue column; flap (114) is used to cover the text column; flap (115) is used to cover a graphics, animation or multi-media column; flap (116) is used to cover a column containing a partial or complete list of topics. The hinges (118) are rigidly connected to the long hinge (117), and rotatably connected to the frame (119), so that the long hinges are perpendicular to the top of the frame, and so that the flap (116) or flaps (112, 113, 114, 115) attached to the long hinge (117) may be flipped to a position outside of the frame (119).

Further, the above description has been set forth merely to illustrate preferred exemplary embodiments of the present invention, and the invention is not limited to the specific forms shown. For example, the computerized version could be programmed to randomly access previously covered topics, rather than allowing the user to choose the topic, thus simulating a pop quiz. Also, the text, rather than the reduced format, could be stored in the database, the reduction of text to the various formats could be performed at a time when the topic is chosen.

These and other modifications may be made in the design and implementation of the elements within the scope of the invention, as expressed in the appended claims.

What is claimed is:

1. A method of presenting information to be learned and/or memorized, comprising:
    (a) listing and recording a topic;
    (b) listing and recording a text corresponding to such topic, wherein the text comprises a plurality of key indicia;
    (c) reducing the information, comprising the steps of:
    reducing the text to a text column format by breaking the text into key indicia;
    reducing the text to a reduced text cue column format; and
    reducing the text to fully reduced text cue column format;
    (d) presenting the information, comprising the steps of, in the order presented,
    presenting the topic and text in text column format; then
    presenting the text in reduced text cue column format; then
    presenting the text in fully reduced text cue column format; then
    presenting no text.

2. A method of presenting information according to claim 1, wherein the key indicia comprises key words, key phrases comprising a plurality of key words and a logical connector, and insignificant words.

3. A method of presenting information according to claim 2, wherein each such key word and each such logical connector is signified by having a capitalized first letter.

4. A method of presenting information according to claim 1, wherein the text further comprises a first plurality of key words, a second plurality of key phrases, a third plurality of insignificant words, and a fourth plurality of lines or words comprising a key word or key phrase followed by at least one insignificant word; the text column format further comprises the lines of words arranged in a succession.

5. A method of presenting information according to claim 4, wherein the succession is vertical.

6. A method of presenting information according to claim 1, further comprising a step of reinforcing the memorization by displaying the fully reduced text cue column format text, the text cue column format text, and the text column format text, and the topic.

7. A method of presenting information according to claim 6, wherein the reinforcing step comprises the steps of, in the order presented;
    displaying the text in fully reduced text cue column format; then
    displaying the text in reduced text cue column format; then
    displaying the topic and the text in text column format.

8. A method of presenting information according to claim 1, wherein the text column, the reduced text cue column, and the fully reduced text cue column are displayed at the same location on a computer screen.

9. A method of presenting information according to claim 1, wherein the text column is presented on a right hand column, the reduced text cue column is presented on a center column, and the fully reduced text cue column is presented on a left-hand column.

10. A method of presenting information according to claim 1, wherein the size and/or style and/or color of the font or type face used to present information depends upon the type of topic being presented.

11. A method of presenting information to be learned and/or memorized, comprising:
   (a) listing and recording a topic;
   (b) listing and recording a text corresponding to such topic, wherein the text comprises at least one of a plurality of key indicia including key words and logical words or phrases, and insignificant words;
   (c) reducing the information, comprising the steps of:
      reducing the text to a text column format by breaking the text into key indicia;
      reducing the text to a reduced text cue column format by replacing each key word in text column format by its capitalized first letter and replacing each logical word or phrase by a logical symbol; and
      reducing the text to fully reduced text cue column format;
   (d) presenting the information, comprising the steps of, in the order presented,
      presenting the topic and text in text column format; then
      presenting the text in reduced text cue column format; then
      presenting the text in fully reduced text cue column format; then
      presenting no text.

12. A method of presenting information according to claim 11, further comprising not representing each insignificant word in the reduced text cue column.

13. A method of presenting information according to claim 11, wherein the fully reduced text cue column format comprises replacing each capital letter in the reduced text cue column by a fully reduced text symbol.

14. A method of presenting information according to claim 13, wherein the fully reduced text symbols are asterisks.

15. A method of presenting information according to claim 13, wherein the fully reduced text symbols are bullets.

16. A method of presenting information according to claim 13, further comprising not representing at least one insignificant word in the fully reduced text cue column.

17. A method of presenting information to be learned and/or memorized, comprising:
   (a) listing and recording a topic;
   (b) listing and recording a text corresponding to such topic, wherein the text comprises a plurality of key indicia comprising a plurality of key words, key phrases comprising a plurality of key words and a logical connector, and insignificant words;
   (c) reducing the information, comprising the steps of:
      reducing the text to a text column format by breaking the text into key indicia;
      reducing the text to a reduced text cue column format by replacing each insignificant word by its first letter; and
      reducing the text to fully reduced text cue column format by replacing each first letter by a non-text symbol;
   (d) presenting the information, comprising the steps of, in the order presented,
      presenting the topic and text in text column format; then
      presenting the text in reduced text cue column format; then
      presenting the text in fully reduced text cue column format; then
      presenting no text.

18. A method of presenting information to be learned and/or memorized, comprising:
   (a) listing and recording a topic;
   (b) listing and recording a text corresponding to such topic, wherein the text comprises a plurality of key indicia comprising key words, key phrases comprising a plurality of key words and a logical connector, and insignificant words, each key word determined to be a key word by ascertaining that they do not match any words set forth in a specified list of insignificant words, and formatted so that each has a capitalized first letter, and each logical connector signified by having a capitalized first letter;
   (c) reducing the information, comprising the steps of:
      reducing the text to a text column format by breaking the text into key indicia;
      reducing the text to a reduced text cue column format; and
      reducing the text to fully reduced text cue column format;
   (d) presenting the information, comprising the steps of, in the order presented,
      presenting the topic an text in text column format; then
      presenting the text in reduced text cue column format; then
      presenting the text in fully reduced text cue column format; then
      presenting no text.

19. A method of presenting information to be learned and/or memorized, comprising:
   (a) listing and recording a topic;
   (b) listing and recording a text corresponding to such topic, wherein the text comprises a plurality of key indicia comprising key words, key phrases comprising a plurality of key words and a logical connector, and insignificant words, each key word signified by having a capitalized first letter, and logical connector determined to be a logical connector by ascertaining that they match a word set forth in a specified list of logical connector words;
   (c) reducing the information, comprising the steps of:
      reducing the text to a text column format by breaking the text into key indicia;
      reducing the text to a reduced text cue column format by replacing logical connectors with specified symbols; and
      reducing the text to fully reduced text cue column format;
   (d) presenting the information, comprising the steps of, in the order presented,
      presenting the topic and text in text column format; then
      presenting the text in reduced text cue column format; then
      presenting the text in fully reduced text cue column format; then
      presenting no text.

* * * * *